United States Patent
Xiao et al.

(10) Patent No.: US 9,533,266 B2
(45) Date of Patent: Jan. 3, 2017

(54) METHOD FOR PREPARING HOMOGENEOUS BRAID-REINFORCED PPTA HOLLOW FIBER MEMBRANE

(71) Applicant: TIANJIN POLYTECHNIC UNIVERSITY, Tianjin (CN)

(72) Inventors: Changfa Xiao, Tianjin (CN); Chun Wang, Tianjin (CN); Mingxing Chen, Tianjin (CN); Qinglin Huang, Tianjin (CN); Hailiang Liu, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 0 days.

(21) Appl. No.: 14/857,874

(22) Filed: Sep. 18, 2015

(65) Prior Publication Data

US 2016/0001233 A1    Jan. 7, 2016

(30) Foreign Application Priority Data

Apr. 20, 2015  (CN) .......................... 2015 1 0189188

(51) Int. Cl.
| | | |
|---|---|---|
| *B01D 67/00* | (2006.01) | |
| *B01D 39/00* | (2006.01) | |
| *B01D 33/21* | (2006.01) | |
| *B01D 69/00* | (2006.01) | |
| *B29C 47/00* | (2006.01) | |
| *B29C 47/88* | (2006.01) | |
| *B01D 71/56* | (2006.01) | |
| *B01D 63/02* | (2006.01) | |
| *B01D 69/12* | (2006.01) | |
| *B01D 69/14* | (2006.01) | |

(52) U.S. Cl.
CPC ............ *B01D 71/56* (2013.01); *B01D 63/027* (2013.01); *B01D 67/0093* (2013.01); *B01D 69/12* (2013.01); *B01D 69/148* (2013.01)

(58) Field of Classification Search
CPC ......... B01D 71/56; B01D 69/02; B01D 69/08; B01D 69/087; B01D 69/148; B01D 71/64; B01D 2325/02; B01D 69/10; B01D 67/0011; B01D 69/105; B32B 1/08; D01D 5/24

USPC ............ 210/500.23, 500.38, 490; 264/178 R
See application file for complete search history.

(56) References Cited

U.S. PATENT DOCUMENTS

| | | | | | |
|---|---|---|---|---|---|
| 4,900,443 | A | * | 2/1990 | Wrasidlo | B01D 61/145 210/490 |
| 4,987,217 | A | * | 1/1991 | Keil | C08G 69/32 528/180 |
| 5,097,015 | A | * | 3/1992 | Miess | C08G 69/36 521/189 |
| 5,128,440 | A | * | 7/1992 | Keil | D01F 6/805 528/125 |
| 5,152,894 | A | * | 10/1992 | Haubs | B01D 71/56 210/490 |
| 5,472,607 | A | * | 12/1995 | Mailvaganam | B01D 69/08 210/490 |
| 8,920,654 | B2 | * | 12/2014 | Revanur | B01D 69/10 210/490 |
| 2010/0036007 | A1 | * | 2/2010 | Journee | C08J 9/236 521/60 |
| 2010/0305217 | A1 | * | 12/2010 | Qiu | B01D 67/0088 514/772.3 |
| 2013/0341273 | A1 | * | 12/2013 | Weber | B01D 71/68 210/644 |
| 2014/0001234 | A1 | * | 1/2014 | Shelton, IV | A61B 17/07207 227/176.1 |
| 2016/0001233 | A1 | * | 1/2016 | Xiao | B01D 63/027 210/500.23 |

* cited by examiner

*Primary Examiner* — Ana Fortuna

(57) ABSTRACT

A method for preparing a homogeneous braid-reinforced (HMR) PPTA hollow fiber membrane combines PPTA hollow tubular braids with PPTA surface separation layer. The method includes following steps of: (1) preparing the PPTA hollow tubular braids, wherein the PPTA hollow tubular braids which are made from PPTA filament yarns are woven by a two-dimensional braided method, the outer diameter of the PPTA tubular braids is 1-2 mm; (2) preparing the PPTA casting solution as the surface separation layer, wherein the 1-3 wt % PPTA resin, 0-2 wt % inorganic particles and 10-20 wt % pore-forming agents are mixed into 75-89% inorganic acid solvent, stirred for 1-3 hours at 70° C.-90° C. to form homogeneous and transparent casting solution; and (3) preparing reinforced PPTA hollow fiber membrane, wherein the casting solution as the surface separation layer is evenly coated on the surfaces of the PPTA hollow tubular braids through spinneret, and they are immersed in a coagulation bath for solidified formation.

2 Claims, No Drawings

METHOD FOR PREPARING HOMOGENEOUS BRAID-REINFORCED PPTA HOLLOW FIBER MEMBRANE

CROSS REFERENCE OF RELATED APPLICATION

The present invention claims priority under 35 U.S.C. 119(a-d) to CN 201510189188.3, filed Apr. 20, 2015.

BACKGROUND OF THE PRESENT INVENTION

Field of Invention

The present invention relates to a technical field of membrane, and more particularly to a method for preparing a homogeneous braid-reinforced (HMR) PPTA hollow fiber membrane.

Description of Related Arts

Poly(p-phenylene terephthamide) (PPTA) has excellent physical and chemical stability, high temperature resistance, alkali resistance, fungus resistance, organic solvent resistance, high strength and modulus. The tensile strength is next to inorganic fiber. PPTA is an important raw material for producing high performance aromatic polyamide fiber, and it is also an ideal material for producing high performance separation membrane. However, PPTA is generally only dissolved few inorganic acid solutions such as concentrated sulfuric acid because of "non-soluble and non-melting". Further, it has poor strength that PPTA hollow fiber membrane is fabricated by solution phase inversion method. Therefore, in the membrane separation process, the homogeneous hollow fiber membranes which subject to high pressure water flow pulsation or disturbance for a long time are easily fractured and damaged by the high-pressure hydraulic backwashing process or pollutants deposition, which will affect the quality of filtrate.

Polymer membrane materials (such as membrane bioreactor (MBR)) are widely used in seawater desalination, food processing, pharmaceutical, and other water treatment fields. However, as for the separation and purification in petrochemical, printing and dyeing, organic solvents and other special areas, the membrane material faces a severe situation due to high mechanical strength of the membrane material is needed.

Reinforced hollow fiber membrane is becoming a highlight of research. In general, there are two methods for preparing reinforced hollow fiber membranes:

One is a porous membrane matrix reinforced hollow fiber membrane. Chinese patent CN102600733A discloses a reinforced polyvinyl fluoride hollow fiber membrane and a preparation method thereof, which prepares a hollow fiber membrane with excellent strength by melting spinning, then the PVDF surface separation layer is evenly coated on the porous membrane matrix. According to polymer components of the surface separation layer and the porous membrane matrix, the porous membrane matrix reinforced hollow fiber membrane is classified into homogeneous reinforced hollow fiber membrane and heterogeneous reinforced hollow fiber membrane. Chinese patent CN103100307A discloses the characteristic of phase interfacial bonding of reinforced hollow fiber membranes, which demonstrates that the characteristic of phase interfacial bonding of the homogeneous reinforced hollow fiber membrane is significantly better than that of the heterogeneous reinforced hollow fiber membrane.

The other one is a fiber-reinforced hollow fiber membrane which comprises filament yarn-reinforced hollow fiber membrane and hollow tubular braid-reinforced membrane. For the filament yarn-reinforced hollow fiber membrane, several filament yarns and casting solution are extruded from a newly redesigned hollow fiber spinneret at the same time, so that the filament yarns are embedded in the polymer membrane in the process of composite membrane. For the braid-reinforced hollow fiber membrane, according to the composite spinning method of fiber skin/core structure, the casting solution is integrated with outer surfaces of hollow tubular braids, then they are prepared into tubular braid-reinforced membrane by non-solvent induced phase inversion method. Methods for preparing fiber-reinforced hollow fiber membranes are disclosed in patents such as U.S. Pat. No. 5,403,485A, CN1864828, CN103432916A, CN1695777 and CN102389721A.

Conventional separation layer material of reinforced hollow fiber membranes comprises polyacrylonitrile (PAN), polyvinyl fluoride (PVDF) and polyvinyl chloride (PVC). Because they are poor chemical stability, the conventional reinforced hollow fiber membranes are easy to swell and even dissolve under harsh environments such as high temperature and organic solvents, which seriously restricts the operation life of the membrane materials. At present, inorganic membranes or cross-linked polymer membranes are applied in these harsh environments. However, inorganic membranes are expensive and preparation process is complex. Moreover, the cross-linked polymer membranes are usually hydrophobic materials, or the hydrophilic materials added into membrane irreversibly decrease in the separation process, resulting in poor anti-fouling and anti-bacteria, which also seriously shortens operation life and increases costs. The applicant has previously applied a method for preparing PPTA porous hollow fiber membrane (Chinese application CN104353372A), but the homogeneous PPTA porous hollow fiber membrane prepared (surface separation layer of composite membrane is made from the same casting solution) is poor mechanical properties in the separation process and is easy to be broken, which is still not able to meet the requirements of actual industrial application.

Within search scope of applicant, the literature about the homogeneous tubular braid-reinforced (HMR) PPTA hollow fiber membrane of the present invention has not been found.

SUMMARY OF THE PRESENT INVENTION

In view of disadvantages of the conventional technology, the technical problem to be solved by the present invention is to provide a method for preparing a homogeneous tubular braid-reinforced (HMR) Poly (p-phenylene terephthamide) (PPTA) hollow fiber membrane. In this method, the PPTA hollow tubular braids are served as the reinforced matrix, and the casting solution made from PPTA is served as the surface separation layer. This kind of HMR PPTA hollow fiber membrane prepared by the described method has excellent mechanical properties and chemical stability. The described method is simple and a relatively lower cost, which is suitable for industrial production.

Accordingly, in order to effectively resolve the above technical problem, the present invention provides a method for preparing a kind of HMR PPTA hollow fiber membrane, which combines PPTA hollow tubular braids with PPTA surface separation layer, wherein the method comprises the following steps of:

(1) preparing the PPTA hollow tubular braids, wherein: the PPTA hollow tubular braids which are made from PPTA filament yarns are woven by a two-dimensional braided method, and they are served as a reinforced matrix for HMR PPTA hollow fiber membranes, the outer diameter of the PPTA tubular braids is 1-2 mm; the filament yarn denier is 50-800 D; the woven pitch is 5-20 mm;

(2) providing surface pre-treatment of the PPTA hollow tubular braids, wherein: the surfaces of the hollow PPTA tubular braids are immersed in a kind of well-known neutral detergent or surfactant for 2-3 h prior to the membrane preparation, and then repeatedly flushed with clean water and totally dried for further use;

(3) preparing the PPTA casting solution as the surface separation layer, wherein: the wholly pre-treated PPTA resin, pore-forming agents and inorganic particles are mixed into the inorganic acid solvent, stirred for 1-3 hours at 70° C.-90° C. to form homogeneous and transparent casting solution, wherein the components of casting solution and a mass fraction of surface separation layer are:

| the PPTA resin | 1-3 wt % |
|---|---|
| the pore-forming agents | 10-20 wt % |
| the inorganic particles | 0-2 wt % |
| the inorganic acid solution | 75-89 wt %, totally 100%; | wherein a logarithmic specific concentration viscosity of the PPTA resin is 4-10 dL/g;

wherein the pore-forming agents are water-soluble macromolecule, which is polyethylene glycol (PEG) with an average molecular weight of 600-20000, or polyvinylpyrrolidone (PVP) with an average molecular weight of 10000-100000, or a mixture of PEG and PVP with a ratio of (4:1)-(10:1) by weight;

wherein the inorganic particles are selected from a group consisting of silicon dioxide, titanium dioxide and graphene oxide;

wherein the inorganic acid solution is concentrated sulfuric acid with a mass concentration at a range of 98-106 wt %; and (4) preparing reinforced PPTA hollow fiber membrane, wherein: the casting solution as the surface separation layer is evenly coated on the surfaces of the PPTA hollow tubular braids through spinneret, and then they are passed through an air bath of 1-10 cm under the winding tension, afterwards they are immersed in a coagulation bath of 0-50° C. for solidified formation, so as to obtain the as-spun HMR PPTA hollow fiber membranes; wherein a spinning temperature is kept at 60-80° C., a speed of winding tension is 1-30 m/h, a coagulation bath is a sulfuric acid solution with a mass fraction of 0-30%.

Compared with the conventional technology, the beneficial effects of the present invention method are as follows: the homogeneous reinforced method is adopted on the basis of adjusted the proportion of the conventional casting solution, namely, the surface separation layer and hollow tubular braids are both made from PPTA. To our relief, the HMR hollow fiber membranes have a great interfacial bonding between the separation layer and reinforced matrix. Not only can the composite membranes hold the original good characteristics of the homogenous fiber membrane, but also can greatly improve mechanical strength of PPTA fiber membrane (tensile strength>600 N, much more than the present commercial reinforced membranes). Furthermore, the HMR PPTA hollow fiber membrane has a higher peel strength, which is capable of suffering from high-pressure backwash. Meanwhile, they can also operate for a long time under harsh conditions such as high temperature (higher>60° C.) and organic solvents (DMAc, DMF, and etc.). Besides, they have excellent anti-fouling performances, as well as the anti-bacteria and mechanical properties. The preparation method is simple and suitable for industrial production in special separation fields including high temperature, organic solvents, acid-base solutions and other harsh areas.

These and other objectives, features, and advantages of the present invention will become apparent from the following detailed description, the accompanying drawings, and the appended claims.

DETAILED DESCRIPTION OF THE PREFERRED EMBODIMENT

One skilled in the art will understand that the embodiment of the present invention as shown in the drawings and described below is exemplary only and not intended to be limiting.

A method for preparing a homogeneous tubular braid-reinforced (HMR) PPTA hollow fiber membrane is provided, which combines PPTA hollow tubular braids with PPTA surface separation layer, wherein the method comprises the following steps of:

(1) preparing the PPTA hollow tubular braids, wherein: the PPTA hollow tubular braids which are made from PPTA filament yarns are woven by a two-dimensional braided method, and they are served as a reinforced matrix for HMR PPTA hollow fiber membranes, the outer diameter of the PPTA tubular braids is 1-2 mm; the filament yarn denier is 50-800 D; the woven pitch is 5-20 mm;

(2) providing surface pre-treatment of the PPTA hollow tubular braids, wherein: the surfaces of the hollow PPTA tubular braids are immersed in a kind of well-known neutral detergent or surfactant for 2-3 h prior to the membrane preparation, and then repeatedly flushed with clean water and totally dried for further use; wherein the neutral detergent is laundry detergent; the surfactant is sodium dodecylsulphate or sodium dodecylsulfate;

(3) preparing the PPTA casting solution as the surface separation layer, wherein: the wholly pre-treated PPTA resin, pore-forming agents and inorganic particles are mixed into the inorganic acid solvent, stirred for 1-3 hours at 70° C.-90° C. to form homogeneous and transparent casting solution, wherein the components of casting solution and a mass fraction of surface separation layer are:

| the PPTA resin | 1-3 wt % |
|---|---|
| the pore-forming agents | 10-20 wt % |
| the inorganic particles | 0-2 wt % |
| the inorganic acid solution | 75-89 wt %, totally 100%; | wherein a logarithmic specific concentration viscosity of the PPTA resin is 4-10 dL/g;

wherein the pore-forming agents are water-soluble macromolecule, which is polyethylene glycol (PEG) with an average molecular weight of 600-20000, or polyvinylpyrrolidone (PVP) with an average molecular weight of 10000-100000, or a mixture of PEG and PVP with a ratio of (4:1)-(10:1) by weight;

wherein the inorganic particles are selected from a group consisting of silicon dioxide, titanium dioxide and graphene oxide;

wherein the inorganic acid solution is concentrated sulfuric acid with a mass concentration at a range of 98-106 wt %; and (4) preparing reinforced PPTA hollow fiber membrane, wherein: the casting solution as the surface separation layer is evenly coated on the surfaces of the PPTA hollow tubular braids through spinneret, and then they are passed through an air bath of 1-10 cm under the winding tension, afterwards they are immersed in a coagulation bath of 0-50° C. for solidified formation, so as to obtain the as-spun HMR PPTA hollow fiber membranes; wherein a spinning temperature is kept at 60-80° C., a speed of winding tension is 1-30 m/h, a coagulation bath is a sulfuric acid solution with a mass fraction of 0-30%.

Compared with the conventional technology, the beneficial effects of the present invention method are as follows: the homogeneous reinforced method is adopted on the basis of adjusted the proportion of the conventional casting solution, namely, the surface separation layer and hollow tubular braids are both made from PPTA. To our relief, the HMR hollow fiber membranes have a great interfacial bonding between the separation layer and reinforced matrix. Not only can the composite membranes hold the original good characteristics of the homogenous fiber membrane, but also can greatly improve mechanical strength of PPTA fiber membrane (tensile strength>600 N, much more than the present commercial reinforced membranes). Furthermore, the HMR PPTA hollow fiber membrane has high peel strength, which is capable of suffering from high-pressure backwash. Meanwhile, they can also operate for a long time under these conditions such as high temperature (higher>60° C.) and organic solvents (DMAc, DMF, and etc.). Besides, they have excellent anti-fouling performances, as well as the anti-bacteria and mechanical properties. The preparation method is simple and suitable for industrial production in special separation fields including high temperature, organic solvents, acid-base solutions and other harsh areas.

The preferred embodiments of the present invention are exemplary only and not intended to be limited.

Preferred embodiments of the present invention are as follows.

Preferred Embodiment 1

A method for preparing an HMR PPTA hollow fiber membrane is provided, which combines PPTA hollow tubular braids with PPTA surface separation layer. The preparation method comprises the following steps of:

(1) preparing the PPTA hollow tubular braids, wherein: the PPTA hollow tubular braids which are made from 220 dtex PPTA filament yarns are woven by a 16-spindle high-speed spinning machine, and they are served as a reinforced matrix for HMR PPTA hollow fiber membranes, the outer diameter is 1.6 mm and the breaking strength is 625 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 1.75 wt % PPTA resin, 0.5 wt % nanometer $SiO_2$ and 10 wt % composite pore-forming agents are mixed into concentrated sulfuric acid with a mass concentration of 98%, stirring for 3 h at 80° C. until being completely dissolved, then totally degassed in vacuum to form homogeneous and transparent casting solution, wherein the composite pore-forming agents are composed by PEG ($M_w$=2000) and PVP ($M_w$=58000) (PEG/PVP=10/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 5 cm under the winding tension of 0.5 m/min, afterwards they are immersed in a coagulation bath (water) of 20° C. for solidified formation, so as to obtain the as-spun HMR PPTA hollow fiber membranes.

After testing, under 0.1 MPa, the pure water flux of the HMR PPTA hollow fiber membrane prepared in the preferred embodiment 1 is 221.18 L/($m^2$h) at a room temperature, and the pure water flux is 400.43 L/($m^2$h) at 90° C. Furthermore, after ultrasonic oscillation for 90 min, the pure water flux is 329.37 L/($m^2$h) at a room temperature, which indicates there is not an obvious exfoliation phenomenon between the surface separation layer and reinforced matrix.

Preferred Embodiment 2

A method for preparing an HMR PPTA hollow fiber membrane is provided, which combines PPTA hollow tubular braids with PPTA surface separation layer. The preparation method comprises the following steps of:

(1) preparing the PPTA hollow tubular braids, wherein: the PPTA hollow tubular braids which are made from 220 dtex PPTA filament yarns are woven by a 16-spindle high-speed spinning machine, and they are served as a reinforced matrix for HMR PPTA hollow fiber membranes, the outer diameter is 1.6 mm; the breaking strength is 625 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 2.5 wt % PPTA resin, 0.5 wt % nanometer $SiO_2$ and 10 wt % composite pore-forming agents are mixed into concentrated sulfuric acid with a mass concentration of 98%, stirred for 3 h at 80° C. until being completely dissolved, then totally degassed in vacuum to form homogeneous and transparent casting solution, wherein the composite pore-forming agents are composed by PEG ($M_w$=2000) and PVP ($M_w$=58000) (PEG/PVP=10/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 5 cm under the winding tension of 0.5 m/min, afterwards they are immersed in a coagulation bath (water) of 20° C. for solidified formation, so as to obtain the as-spun HMR PPTA hollow fiber membranes.

After testing, under 0.1 MPa, the pure water flux of the HMR PPTA hollow fiber membrane prepared in the preferred embodiment 2 is 130.64 L/($m^2$h) at a room temperature, and the pure water flux is 264.78 L/($m^2$h) at 90° C. Furthermore, after ultrasonic oscillation for 90 min, the pure water flux is 159.75 L/($m^2$h) at a room temperature, which indicates there is not an obvious exfoliation phenomenon between the surface separation layer and reinforced matrix.

Because the surface pre-treatment of the PPTA hollow tubular braids just aims to wash away the oil or impurities on the surface of PPTA filament yarn, thus there is no significant influence on the present invention. The surfactant has similar effect with laundry detergent, so the sodium dodecylsulphate is mostly used in this invention. Besides, there is also no strict standard for treated time. Generally speaking, in order to reduce experimental variables and increase spinning efficiency, the pre-treatment time of 2-3 hour is usually enough. Therefore, in all preferred embodiments, the 3 h is chosen.

Comparison Example 1

Comparison example 1 is preparation of homogeneous PPTA hollow fiber membrane, comprising the following steps as follows: according to the proportion of the casting solution as the surface separation layer in the preferred embodiment 2, the casting solution is totally mixed into a sealed stirring vessel until obtain transparent yellow thick liquid, then the casting solution is squeezed into a hollow spinneret after measuring by a metering pump, wherein an extension ratio of a spinning jet is 2 times, then the casting solution is extruded by the hollow spinneret, thus an air bath is passed through which is a height of 5 cm, and immersed in 20° C. pure water coagulation bath to obtain an as-spun PPTA porous hollow fiber membrane. Further, the as-spun PPTA porous hollow fiber membranes are washed and neutralized in clean water for 48 h at a room temperature, so as to obtain homogeneous PPTA hollow fiber membrane. After testing, under 0.1 MPa, the pure water flux is 100.53 L/(m$^2$h) at a room temperature. The static contact angle is 36.3° and a breaking strength is 1.5 MPa.

Preferred Embodiment 3

A method for preparing an HMR PPTA hollow fiber membrane is provided, which combines PPTA hollow tubular braids with PPTA surface separation layer). The preparation method comprises the following steps of:

(1) preparing the PPTA hollow tubular braids, wherein: the PPTA hollow tubular braids which are made from 440 dtex PPTA filament yarns are woven by a 16-spindle high-speed spinning machine, and they are served as a reinforced matrix for HMR PPTA hollow fiber membranes, the outer diameter is 1.3 mm; the breaking strength is 642 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 1.75 wt % PPTA resin, 0.5 wt % nanometer SiO$_2$ and 10 wt % composite pore-forming agents are mixed into concentrated sulfuric acid with a mass concentration of 98%, stirred for 3 h at 80° C. until being completely dissolved, then totally degassed in vacuum to form homogeneous and transparent casting solution, wherein the composite pore-forming agents are composed by PEG (M$_w$=2000) and PVP (M$_w$=58000) (PEG/PVP=10/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 5 cm under the winding tension of 0.5 m/min, afterwards they are immersed in a coagulation bath (water) of 20° C. for solidified formation, so as to obtain the as-spun HMR PPTA hollow fiber membranes.

After testing, under 0.1 MPa, the pure water flux of the HMR PPTA hollow fiber membrane prepared in the preferred embodiment 3 is 245.42 L/(m$^2$h) at a room temperature. Furthermore, after ultrasonic oscillation for 90 min, the pure water flux is 358.94 L/(m$^2$h) at a room temperature, which indicates there is not an obvious exfoliation phenomenon between the surface separation layer and reinforced matrix.

Preferred Embodiment 4

A method for preparing an HMR PPTA hollow fiber membrane is provided, which combines PPTA hollow tubular braids with PPTA surface separation layer. The preparation method comprises the following steps of:

(1) preparing the PPTA hollow tubular braids, wherein: the PPTA hollow tubular braids which are made from 220 dtex PPTA filament yarns are woven by a 16-spindle high-speed spinning machine, and they are served as a reinforced matrix for HMR PPTA hollow fiber membranes, the outer diameter is 1.6 mm; the breaking strength is 625 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 1.75 wt % PPTA resin, 0.5 wt % nanometer SiO$_2$ and 10 wt % composite pore-forming agents are mixed into concentrated sulfuric acid with a mass concentration of 98%, stirred for 3 h at 80° C. until being completely dissolved, then totally degassed in vacuum to form homogeneous and transparent casting solution, wherein the composite pore-forming agents are composed by PEG (M$_w$=2000) and PVP (M$_w$=58000) (PEG/PVP=10/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 5 cm under the winding tension of 2 m/min, afterwards they are immersed in a coagulation bath (water) of 20° C. for solidified formation, so as to obtain the as-spun HMR PPTA hollow fiber membranes.

After testing, under 0.1 MPa, the pure water flux of the HMR PPTA hollow fiber membrane prepared in the preferred embodiment 4 is 285.55 L/(m$^2$h) at a room temperature. Furthermore, after ultrasonic oscillation for 90 min, the pure water flux is 353.56 L/(m$^2$h) at a room temperature, which indicates there is not an obvious exfoliation phenomenon between the surface separation layer and reinforced matrix.

Preferred Embodiment 5

A method for preparing an HMR PPTA hollow fiber membrane is provided, which combines PPTA hollow tubular braids with PPTA surface separation layer. The preparation method comprises the following steps of:

(1) preparing the PPTA hollow tubular braids, wherein: the PPTA hollow tubular braids which are made from 220 dtex PPTA filament yarns are woven by a 16-spindle high-speed spinning machine, and they are served as a reinforced matrix for HMR PPTA hollow fiber membranes, the outer diameter is 1.6 mm; the breaking strength is 625 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 2.0 wt % PPTA resin, 0.5 wt % nanometer $SiO_2$ and 10 wt % composite pore-forming agents are mixed into concentrated sulfuric acid with a mass concentration of 98%, stirred for 3 h at 80° C. until being completely dissolved, then totally degassed in vacuum to form homogeneous and transparent casting solution, wherein the composite pore-forming agents are composed by PEG ($M_w$=2000) and PVP ($M_w$=58000) (PEG/PVP=9/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 8 cm under the winding tension of 0.5 m/min, afterwards they are immersed in a coagulation bath (water) of 20° C. for solidified formation, so as to obtain the as-spun HMR PPTA hollow fiber membranes.

After testing, under 0.1 MPa, the DMAc, DMF, THF and $CHCl_3$ fluxes of the HMR PPTA hollow fiber membrane prepared in the preferred embodiment 5 are respectively 282.17 L/($m^2$h), 231.25 L/($m^2$h), 184.77 L/($m^2$h) and 193.64 L/($m^2$h) at 65° C. The membrane structure is complete and a mass loss is less than 1%.

Preferred Embodiment 6

A method for preparing an HMR PPTA hollow fiber membrane is provided, which combines PPTA hollow tubular braids with PPTA surface separation layer. The preparation method comprises the following steps of:

(1) preparing the PPTA hollow tubular braids, wherein: the PPTA hollow tubular braids which are made from 220 dtex PPTA filament yarns are woven by a 16-spindle high-speed spinning machine, and they are served as a reinforced matrix for HMR PPTA hollow fiber membranes, the outer diameter is 1.6 mm; the breaking strength is 625 N;

(2) providing surface pre-treatment of the PPTA hollow tubular braids, wherein: the surfaces of the PPTA hollow tubular braids obtained in the step (1) are immersed in the sodium dodecylsulphate (which is a surfactant) for 3 h prior to the membrane preparation, and then repeatedly flushed with clean water and totally dried for further use;

(3) preparing the PPTA casting solution as the surface separation layer, wherein: the 2.0 wt % PPTA resin, 0.5 wt % nanometer $SiO_2$, 0.1 wt % grapheme oxide (0.5-5 µm) and 10 wt % composite pore-forming agents are mixed into concentrated sulfuric acid with a mass concentration of 98%, stirred for 3 h at 80° C. until being completely dissolved, then totally degassed in vacuum to form homogeneous and transparent casting solution, wherein the composite pore-forming agents are composed by PEG ($M_w$=2000) and PVP ($M_w$=58000) (PEG/PVP=9/1); and (4) preparing reinforced PPTA hollow fiber membrane, wherein: according to the co-extrusion composite spinning technique, the casting solution as the surface separation layer is evenly coated on the surfaces of the PPTA hollow tubular braids through spinneret, and then they are passed through an air bath of 8 cm under the winding tension of 1 m/min, afterwards they are immersed in a coagulation bath (water) of 20° C. for solidified formation, so as to obtain the as-spun HMR PPTA hollow fiber membranes.

After testing, under 0.1 MPa, the pure water flux of the HMR PPTA hollow fiber membrane prepared in the preferred embodiment 6 is 347.28 L/($m^2$h) at a room temperature. Besides, the surface static contact angle decreases by 5-10°.

Preferred Embodiment 7

In order to further evaluate the anti-fouling properties, simulated MBR process is introduced to characterize the HMR PPTA hollow fiber membrane prepared in preferred embodiment 5, namely, the membranes are immersed in a simulated activated sludge tank for 30 days, and then the performances are observed in the pretest-posttest experiments. After testing, the flux recovery ratio reaches above 90% after backwash treatment with citric acid solution, as well as the chemical oxygen demand (COD) removal rate is 99%.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparing a homogeneous tubular braid-reinforced (EMIR) PPTA hollow fiber membrane, which combines PPTA hollow tubular braids with PPTA surface separation layer, wherein the method comprises the following steps of:
    (1) preparing PPTA hollow tubular braids, wherein: the PPTA hollow tubular braids which are made from PPTA filament yarns are woven by a two-dimensional braided method, and they are served as a reinforced matrix for HMR PPTA hollow fiber membranes, wherein an outer diameter of the PPTA tubular braids is 1-2 mm; a filament yarn denier is 50-800 D; a woven pitch is 5-20 mm;
    (2) preparing the PPTA surface separation layer, wherein: dried PPTA resin, pore-forming agents and inorganic particles are mixed into an inorganic acid solvent, stirred for 1-3 hours at 70° C.-90° C. to form homogeneous and transparent casting solution, wherein components of casting solution and a mass fraction of surface separation layer are:

| | |
|---|---|
| the PPTA resin | 1-3 wt % |
| the pore-forming agents | 10-20 wt % |
| the inorganic particles | 0-2 wt % |
| the inorganic acid solution | 75-89 wt %, totally 100%; | wherein a logarithmic specific concentration viscosity of the PPTA resin is 4-10 dL/g;
   wherein the pore-forming agents are water-soluble macromolecule, which is polyethylene glycol (PEG) with an average molecular weight of 600-20000, or polyvinylpyrrolidone (PVP) with an average molecular weight of 10000-100000, or a mixture of the PEG and the PVP with a ratio of (4:1)-(10:1) by weight;
   wherein the inorganic particles are selected from a group consisting of silicon dioxide, titanium dioxide and graphene oxide;

wherein the inorganic acid solution is concentrated sulfuric acid with a mass concentration at a range of 98-106 wt %; and (3) preparing reinforced PPTA hollow fiber membrane, wherein: the casting solution is evenly coated on the surfaces of the PPTA hollow tubular braids through spinneret, and then they are passed through an air bath of 1-10 cm under the winding tension, afterwards they are immersed in a coagulation bath of 0-50° C. for solidified formation, so as to obtain the HMR PPTA hollow fiber membranes, wherein a spinning temperature is kept at 60-80° C., a speed of winding tension is 1-30 m/h, a coagulation bath is a sulfuric acid solution with a mass fraction of no more than 30%.

2. A homogeneous braid-reinforced (HMR) PPTA hollow fiber membrane prepared by the method as recited in claim 1, wherein the HMR PPTA hollow fiber membrane has a dense surface separation layer and a micro-pore structure.

* * * * *